United States Patent
Gunnels et al.

(10) Patent No.: US 11,475,189 B2
(45) Date of Patent: *Oct. 18, 2022

(54) ADAPTIVE ERROR CORRECTION IN QUANTUM COMPUTING

(71) Applicant: International Business Machines Corporation, Armonk, NY (US)

(72) Inventors: John A. Gunnels, Somers, NY (US); Mark Wegman, Mt. Kisco, NY (US); David Kaminsky, Chapel Hill, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/235,683

(22) Filed: Apr. 20, 2021

(65) Prior Publication Data

US 2021/0240893 A1    Aug. 5, 2021

Related U.S. Application Data

(63) Continuation of application No. 16/370,062, filed on Mar. 29, 2019, now Pat. No. 11,048,839.

(51) Int. Cl.
*G06F 30/30* (2020.01)
*G06N 10/00* (2022.01)
*G06F 111/20* (2020.01)

(52) U.S. Cl.
CPC ............. *G06F 30/30* (2020.01); *G06N 10/00* (2019.01); *G06F 2111/20* (2020.01)

(58) Field of Classification Search
CPC ................. G06F 30/30; G06F 2111/20; G06F 2117/02; G06N 10/00; B82Y 10/00
See application file for complete search history.

(56) References Cited

U.S. PATENT DOCUMENTS 11,048,839 B2 *   6/2021   Gunnels .................. G06F 30/30

OTHER PUBLICATIONS

List of all IBM related dockets, 2021.
(Continued)

*Primary Examiner* — Jack Chiang
*Assistant Examiner* — Aric Lin
(74) *Attorney, Agent, or Firm* — Garg Law Firm, PLLC; Rakesh Garg; Joseph Petrokaitis

(57) ABSTRACT

A method for adaptive error correction in quantum computing includes executing a calibration operation on a set of qubits, the calibration operation determining an initial state of a quantum processor. In an embodiment, the method includes estimating, responsive to determining an initial state of the quantum processor, a runtime duration for a quantum circuit design corresponding to a quantum algorithm, the quantum processor configured to execute the quantum circuit design. In an embodiment, the method includes computing an error scenario for the quantum circuit design. In an embodiment, the method includes selecting, using the error scenario and the initial state of the quantum processor, a quantum error correction approach for the quantum circuit design. In an embodiment, the method includes transforming the quantum algorithm into the quantum circuit design, the quantum circuit design including a set of quantum logic gates.

20 Claims, 9 Drawing Sheets

(56) References Cited

OTHER PUBLICATIONS

Examination report No. 1 for standard patent application 2020252872, received from Australian Patent Office, dated Aug. 26, 2022.

* cited by examiner

ADAPTIVE ERROR CORRECTION IN QUANTUM COMPUTING

BACKGROUND

The present invention relates generally to a method for quantum computing. More particularly, the present invention relates to a method for adaptive error correction in quantum computing.

Hereinafter, a "Q" prefix in a word of phrase is indicative of a reference of that word or phrase in a quantum computing context unless expressly distinguished where used.

Molecules and subatomic particles follow the laws of quantum mechanics, a branch of physics that explores how the physical world works at the most fundamental levels. At this level, particles behave in strange ways, taking on more than one state at the same time, and interacting with other particles that are very far away. Quantum computing harnesses these quantum phenomena to process information.

The computers we commonly use today are known as classical computers (also referred to herein as "conventional" computers or conventional nodes, or "CN"). A conventional computer uses a conventional processor fabricated using semiconductor materials and technology, a semiconductor memory, and a magnetic or solid-state storage device, in what is known as a Von Neumann architecture. Particularly, the processors in conventional computers are binary processors, i.e., operating on binary data represented by 1 and 0.

A quantum processor (q-processor) uses the unique nature of entangled qubit devices (compactly referred to herein as "qubit," plural "qubits") to perform computational tasks. In the particular realms where quantum mechanics operates, particles of matter can exist in multiple states—such as an "on" state, an "off" state, and both "on" and "off" states simultaneously. Where binary computing using semiconductor processors is limited to using just the on and off states (equivalent to 1 and 0 in binary code), a quantum processor harnesses these quantum states of matter to output signals that are usable in data computing.

Conventional computers encode information in bits. Each bit can take the value of 1 or 0. These 1 s and 0 s act as on/off switches that ultimately drive computer functions. Quantum computers, on the other hand, are based on qubits, which operate according to two key principles of quantum physics: superposition and entanglement. Superposition means that each qubit can represent both a 1 and a 0 inference between possible outcomes for an event. Entanglement means that qubits in a superposition can be correlated with each other in a non-classical way; that is, the state of one (whether it is a 1 or a 0 or both) can depend on the state of another, and that there is more information contained within the two qubits when they are entangled than as two individual qubits.

Using these two principles, qubits operate as processors of information, enabling quantum computers to function in ways that allow them to solve certain difficult problems that are intractable using conventional computers.

A superconducting qubit includes a Josephson junction. A Josephson junction is formed by separating two thin-film superconducting metal layers by a non-superconducting material. When the metal in the superconducting layers is caused to become superconducting—e.g. by reducing the temperature of the metal to a specified cryogenic temperature—pairs of electrons can tunnel from one superconducting layer through the non-superconducting layer to the other superconducting layer. In a qubit, the Josephson junction—which functions as a dispersive nonlinear inductor—is electrically coupled in parallel with one or more capacitive devices forming a nonlinear microwave oscillator. The oscillator has a resonance/transition frequency determined by the value of the inductance and the capacitance in the qubit circuit.

The information processed by qubits is carried or transmitted in the form of microwave signals/photons in the range of microwave frequencies. The microwave signals are captured, processed, and analyzed to decipher the quantum information encoded therein. A readout circuit is a circuit coupled with the qubit to capture, read, and measure the quantum state of the qubit. An output of the readout circuit is information usable by a q-processor to perform computations.

A superconducting qubit has two quantum states—|0> and |1>. These two states may be two energy states of atoms, for example, the ground (|g>) and first excited state (|e>) of a superconducting artificial atom (superconducting qubit). Other examples include spin-up and spin-down of the nuclear or electronic spins, two positions of a crystalline defect, and two states of a quantum dot. Since the system is of a quantum nature, any combination of the two states are allowed and valid.

For quantum computing using qubits to be reliable, quantum circuits, e.g., the qubits themselves, the readout circuitry associated with the qubits, and other parts of the quantum processor, must not alter the energy states of the qubit, such as by injecting or dissipating energy, in any significant manner or influence the relative phase between the |0> and |1> states of the qubit. This operational constraint on any circuit that operates with quantum information necessitates special considerations in fabricating semiconductor and superconducting structures that are used in such circuits.

In conventional circuits, Boolean logic gates arranged in succession manipulate a series of bits. The technology for optimizing the gate-logic for binary computations is well-known. Circuit optimization software for conventional circuits aims to increase efficiency and decrease complexity of conventional circuits. Circuit optimization software for conventional circuits functions in part by decomposing the overall desired behavior of the conventional circuit into simpler functions. The conventional circuit optimization software more easily manipulates and processes the simpler functions. The circuit optimization software generates an efficient layout of design elements on the conventional circuit. As a result, circuit optimization software for conventional circuits significantly reduces resource demands, thereby increasing efficiency and decreasing complexity.

The illustrative embodiments recognize that in quantum circuits, quantum gates manipulate qubits to perform quantum computations. Quantum gates are unitary matrix transformations acting on qubits. Due to the superposition and entanglement of qubits, quantum gates represent a $2^n$ by $2^n$ matrix, where n is the number of qubits the quantum gate manipulates. The illustrative embodiments recognize that the decomposition of such matrix transformations quickly becomes too complex to perform by hand due to the exponential increase in the size of the matrix transformations with the number of qubits. For example, quantum computers with 2 qubits require a 4 by 4 matrix operator for quantum gate representation. As a result of the exponential increase, manual quantum logic gate matrix transformations quickly become unmanageable as the number of qubits increases.

The depth of a quantum circuit is the total number of time steps. Each time step corresponds to a quantum logic gate acting on a set of qubits.

The illustrative embodiments recognize that quantum processors exhibit varying physical characteristics over a period of time. The illustrative embodiments recognize that calibration of quantum processors determines error rates for associated qubits and quantum gates of the quantum processor. The illustrative embodiments further recognize that quantum processors are often calibrated only once or twice daily.

The illustrative embodiments recognize that quantum computers are more susceptible to errors than classical computers due to the sensitivity of quantum computers resulting in unwanted interactions with the environment. The illustrative embodiments recognize that quantum states and quantum operations are continuous, i.e. belong to continuous intervals, which allows small errors to accumulate over an entire quantum circuit. The illustrative embodiments further recognize that classical error correcting schemes perform a measurement to inquire about the nature and type of error. The illustrative embodiments recognize that performing a measurement on a quantum system collapses the quantum system and can result in loss of information encoded in a quantum state from collapsing the quantum state to a classical state.

The illustrative embodiments recognize that presently available quantum error correction techniques require varying amounts of quantum computing resources to operate. A three-qubit bit flip code uses three qubits to determine and correct errors in one of the three qubits. The first, or target qubit, is transmitted through a noisy channel which either flips the state of the first qubit, with probability p, or leaves the state of the first qubit unchanged. Thus, the state of the first qubit is correctly transmitted with probability 1-p.

To improve this probability, the state of the first qubit is encoded into additional qubits. The first qubit is entangled with two ancillary qubits, and all three qubits are initialized in state |0>. As the encoded state of three qubits is transmitted through the noisy channel, the channel acts on the encoded state and flips a subset of the three qubits. The probability no qubit is flipped is $(1-p)^3$. The probability a single qubit is flipped is $3p*(1-p)^2$. Two qubits are flipped with probability $3*p^2*(1-p)$ and all three qubits are flipped with probability $p^3$.

The illustrative embodiments recognize that p is generally a very small number. By determining whether one qubit differs from the others, detection of whether one of the qubits was flipped is determined. Since all qubits began in the same state, if any qubit differs from the others, the qubit was flipped while transmitting through the channel. If the qubit was flipped, a Pauli X gate or quantum bit-flip gate is applied to the flipped qubit.

The illustrative embodiments further recognize that sign flip produces another error in quantum computers. A Hadamard gate maps basis state |0> to $(|0>+|1>)/\sqrt{2}$ and basis state |1> to $(|0>-|1>)/\sqrt{2}$. Using the three qubit bit flip code above and adding a layer of Hadamard gates on each qubit before and after transmission through the noisy channel, the three qubit bit flip code is transformed to a three qubit sign flip code.

The illustrative embodiments further recognize that more complex quantum error correction techniques require additional quantum computing resources. The Shor code requires nine total qubits, one target qubit and eight ancillary qubits. The Shor code corrects for bit slips, sign flips, and any arbitrary single-qubit errors. The Steane code requires seven total qubits, one target qubit and six ancillary qubits to correct for any arbitrary single-qubit errors. Calderbank-Shor-Steane (CSS) codes require a minimum of five total qubits, one target qubit and four ancillary qubits to correct for any arbitrary single-qubit errors. The illustrative embodiments recognize that choosing an appropriate error correction technique depends on the quantum computing resources available.

SUMMARY

The illustrative embodiments provide a method for adaptive error correction in quantum computing. In an embodiment, a method includes executing a calibration operation on a set of qubits, the calibration operation determining an initial state of a quantum processor. In an embodiment, a method includes estimating, responsive to determining an initial state of the quantum processor, a runtime duration for a quantum circuit design corresponding to a quantum algorithm, the quantum processor configured to execute the quantum circuit design.

In an embodiment, a method includes computing an error scenario for the quantum circuit design. In an embodiment, a method includes selecting, using the error scenario and the initial state of the quantum processor, a quantum error correction approach for the quantum circuit design. In an embodiment, a method includes transforming the quantum algorithm into the quantum circuit design, the quantum circuit design including a set of quantum logic gates.

In an embodiment, a subset of the set of quantum logic gates corresponds to the selected quantum error correction approach. In an embodiment, the initial state of the quantum processor includes a total number of qubits of the quantum processor. In an embodiment, a method includes determining a depth of the quantum circuit design.

In an embodiment, a method includes assigning a set of weights to the set of quantum logic gates. In an embodiment, a method includes comparing the quantum circuit design to a set of previously executed quantum circuit designs. In an embodiment, a method includes determining a first computation cost for the selected quantum error correction approach.

In an embodiment, a method includes determining a second computation cost for a probabilistic quantum error correction approach. In an embodiment, a method includes comparing the quantum circuit design to a set of previously executed quantum circuit designs. In an embodiment, a method includes selecting a quantum error correction approach for a first quantum circuit design of the set of previously executed quantum circuit designs. In an embodiment, a method includes transforming the quantum algorithm into a new quantum circuit design, the new quantum circuit design including a set of quantum logic gates corresponding to the first quantum circuit design.

An embodiment includes a computer usable program product. The computer usable program product includes a computer-readable storage device, and program instructions stored on the storage device.

In an embodiment, the computer usable code is stored in a computer readable storage device in a data processing system, and wherein the computer usable code is transferred over a network from a remote data processing system. In an embodiment, the computer usable code is stored in a computer readable storage device in a server data processing system, and wherein the computer usable code is downloaded over a network to a remote data processing system for use in a computer readable storage device associated with the remote data processing system.

An embodiment includes a computer system. The computer system includes a processor, a computer-readable memory, and a computer-readable storage device, and program instructions stored on the storage device for execution by the processor via the memory.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
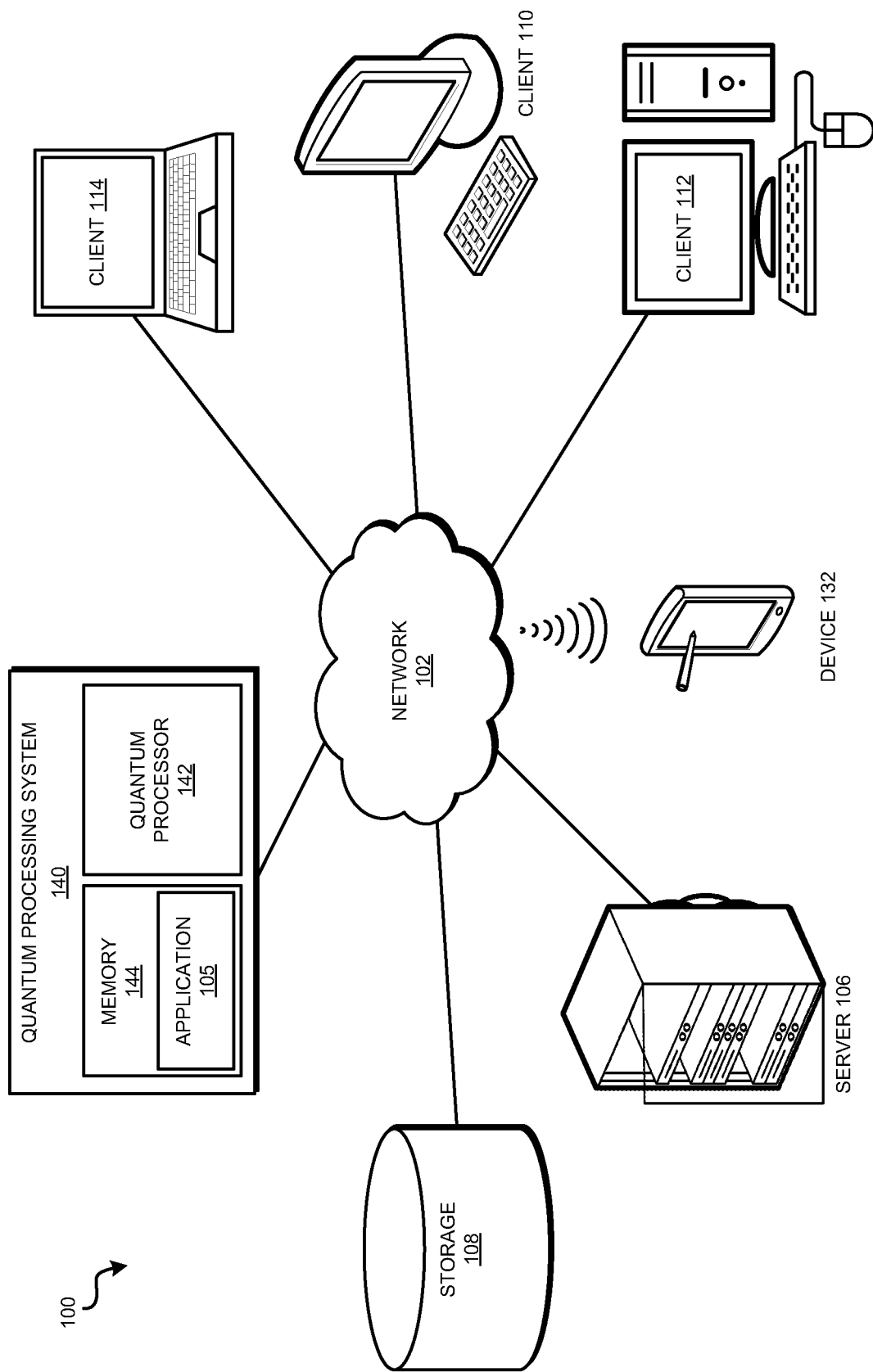
FIG. 1 depicts a block diagram of a network of data processing systems in which illustrative embodiments may be implemented.

The illustrative embodiments used to describe the invention generally address and solve the above-described needs for reducing error rates on qubits and quantum gates in a quantum processor. The illustrative embodiments provide a method for adaptive error correction in quantum computing.

In an embodiment, an initiation of a quantum algorithm on a quantum computer is detected. In the embodiment, an initial state of degradation for the quantum computer is determined. In particular embodiments, randomized benchmarking is used to determine the initial state of degradation for the quantum computer. In particular embodiments, a set of pre-determined operations on a plurality of qubits are performed on the quantum computer. The set of pre-determined operations generate a set of values for each qubit in response to performing the set of pre-determined operations. In an embodiment, at least one of the set of values for each qubit are compared to an expected answer of at least one of the set of pre-determined operations.

In an embodiment, a time period for the quantum algorithm is estimated. In particular embodiments, the depth of the quantum circuit is determined. In an embodiment, an application determines a frequency of gates performed on a set of qubits. In particular embodiments, weights are assigned to quantum logic gates of a quantum circuit corresponding to the quantum algorithm. In particular embodiments, quantum logic gates with greater error rates are assigned greater weights. In an embodiment, an application compares the estimated time period to a decoherence time of a set of qubits of the quantum processor.

In an embodiment, the quantum algorithm is compared to a second quantum algorithm, the second quantum algorithm corresponding to a compiled quantum circuit. In particular embodiments, the initial state of the quantum computer is compared to a second initial state corresponding to the second quantum algorithm.

In an embodiment, an error correction approach is selected responsive to the comparison. In particular embodiments, an error correction approach includes executing a plurality of iterations of the quantum algorithm, the plurality of iterations producing a plurality of outputs. In particular embodiments, the plurality of outputs are averaged. In particular embodiments, a second time period for the selected error correction approach is selected.

An operation described herein as occurring with respect to a frequency of frequencies should be interpreted as occurring with respect to a signal of that frequency or frequencies. All references to a "signal" are references to a microwave signal unless expressly distinguished where used.

For the clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the example resistors, inductors, capacitors, and other circuit components are used in the figures and the illustrative embodiments. In an actual fabrication or circuit, additional structures or component that are not shown or described herein, or structures or components different from those shown but for a similar function as described herein may be present without departing the scope of the illustrative embodiments.

The illustrative embodiments are described with respect to certain types of materials, electrical properties, steps, numerosity, frequencies, circuits, components, and applications only as examples. Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
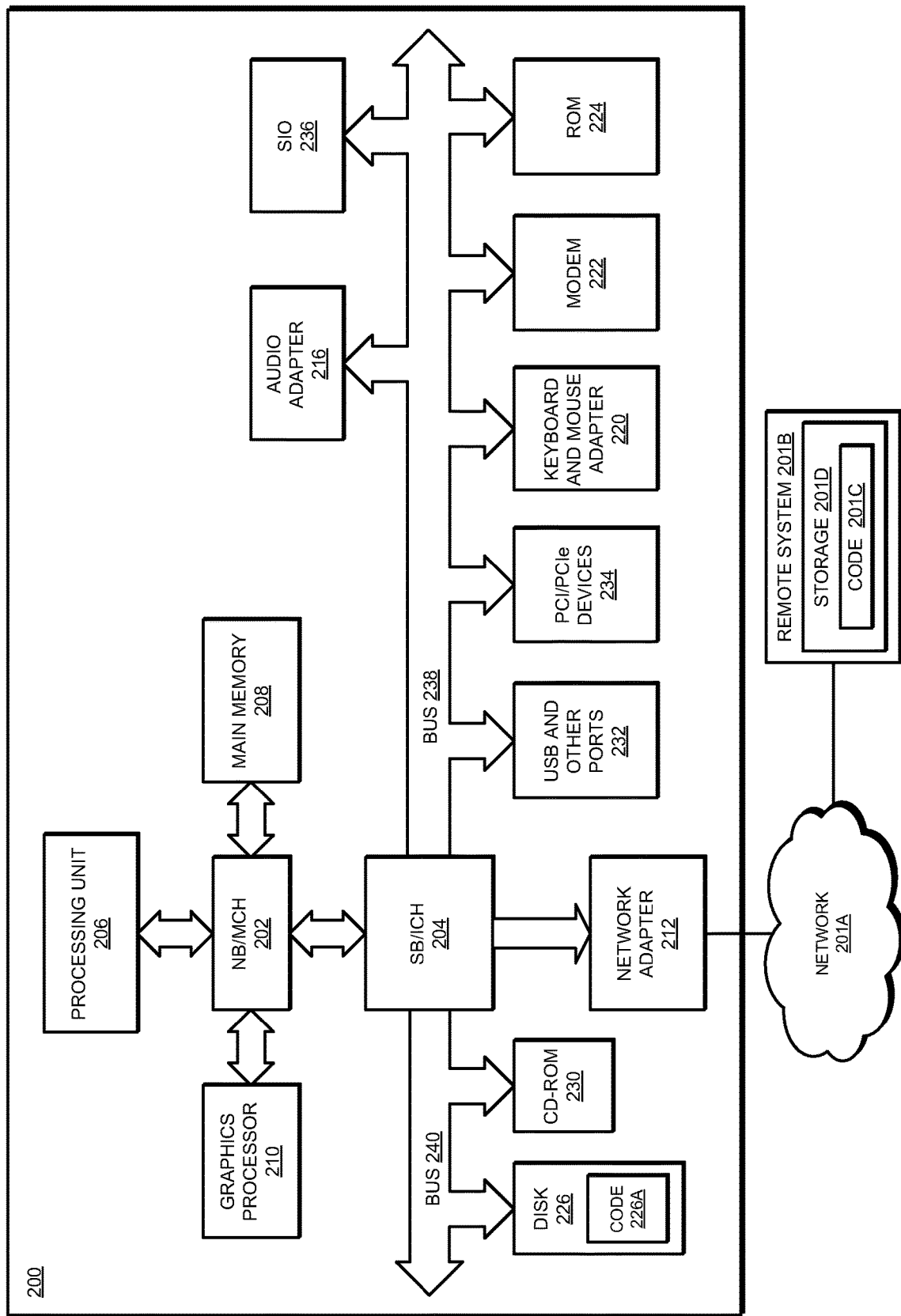
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Classical processing system 104 couples to network 102. Classical processing system 104 is a classical processing system. Software applications may execute on any quantum data processing system in data processing environment 100. Any software application described as executing in classical processing system 104 in FIG. 1 can be configured to execute in another data processing system in a similar manner. Any data or information stored or produced in classical processing system 104 in FIG. 1 can be configured to be stored or produced in another data processing system in a similar manner. A classical data processing system, such as classical processing system 104, may contain data and may have software applications or software tools executing classical computing processes thereon.

Server 106 couples to network 102 along with storage unit 108. Server 106 is a conventional data processing system. Storage unit 108 can store a set of quantum algorithms, a set of quantum circuits, a set of quantum logic gates, and a set of quantum error correction codes as described herein. Quantum processing system 140 couples to network 102. Quantum processing system 140 is a quantum data processing system. Software applications may execute on any quantum data processing system in data processing environment 100. Any software application described as executing in quantum processing system 140 in FIG. 1 can be configured to execute in another quantum data processing system in a similar manner. Any data or information stored or produced in quantum processing system 140 in FIG. 1 can be configured to be stored or produced in another quantum data processing system in a similar manner. A quantum data processing system, such as quantum processing system 140, may contain data and may have software applications or software tools executing quantum computing processes thereon.

Clients 110, 112, and 114 are also coupled to network 102. A conventional data processing system, such as server 106, or client 110, 112, or 114 may contain data and may have software applications or software tools executing conventional computing processes thereon.

Only as an example, and without implying any limitation to such architecture, FIG. 1 depicts certain components that are usable in an example implementation of an embodiment. For example, server 106, and clients 110, 112, 114, are depicted as servers and clients only as example and not to imply a limitation to a client-server architecture. As another example, an embodiment can be distributed across several conventional data processing systems, quantum data processing systems, and a data network as shown, whereas another embodiment can be implemented on a single conventional data processing system or single quantum data processing system within the scope of the illustrative embodiments. Conventional data processing systems 106, 110, 112, and 114 also represent example nodes in a cluster, partitions, and other configurations suitable for implementing an embodiment.

Device 132 is an example of a conventional computing device described herein. For example, device 132 can take the form of a smartphone, a tablet computer, a laptop computer, client 110 in a stationary or a portable form, a wearable computing device, or any other suitable device. Any software application described as executing in another conventional data processing system in FIG. 1 can be configured to execute in device 132 in a similar manner. Any data or information stored or produced in another conventional data processing system in FIG. 1 can be configured to be stored or produced in device 132 in a similar manner.

Server 106, storage unit 108, classical processing system 104, quantum processing system 140, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 106 may provide data, such as boot files, operating system images, and applications to clients 110, 112, and 114. Clients 110, 112, and 114 may be clients to server 106 in this example. Clients 110, 112, 114, or some combination thereof, may include their own data, boot files, operating system images, and applications. Data processing environment 100 may include additional servers, clients, and other devices that are not shown.

In the depicted example, memory 144 may provide data, such as previously compiled quantum algorithms, quantum logic gates, quantum error correction codes, boot files, operating system images, and applications to quantum processor 142. Quantum processor 142 may include its own data, boot files, operating system images, and applications. Data processing environment 100 may include additional memories, quantum processors, and other devices that are not shown. Memory 144 includes application 105 that may be configured to implement one or more of the quantum processor functions described herein in accordance with one or more embodiments.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a conventional client data processing system and a conventional server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
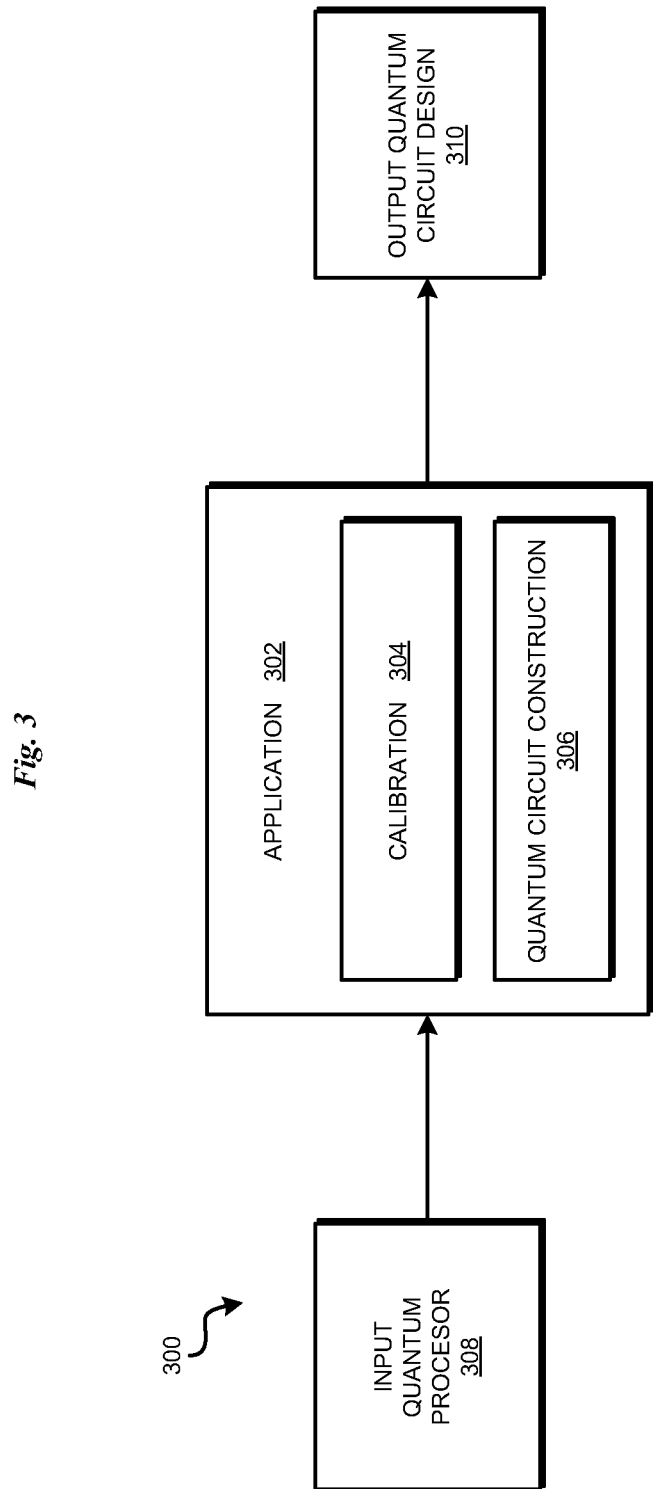
FIG. 3 depicts an example configuration of adaptive error correction in quantum computing in accordance with an illustrative embodiment.

With reference to FIG. 3, this figure depicts an example configuration of adaptive error correction in quantum computing in accordance with an illustrative embodiment. The example embodiment includes an application 302. In a particular embodiment, application 302 is an example of application 105 in FIG. 1. Application 302 includes a calibration component 304 and a quantum circuit construction component 306. Calibration component 304 calibrates an input quantum processor 308 in accordance with an example method described herein. Quantum circuit construction component 306 compiles an output quantum circuit design 310 in accordance with an example method described herein.

Figure 4:
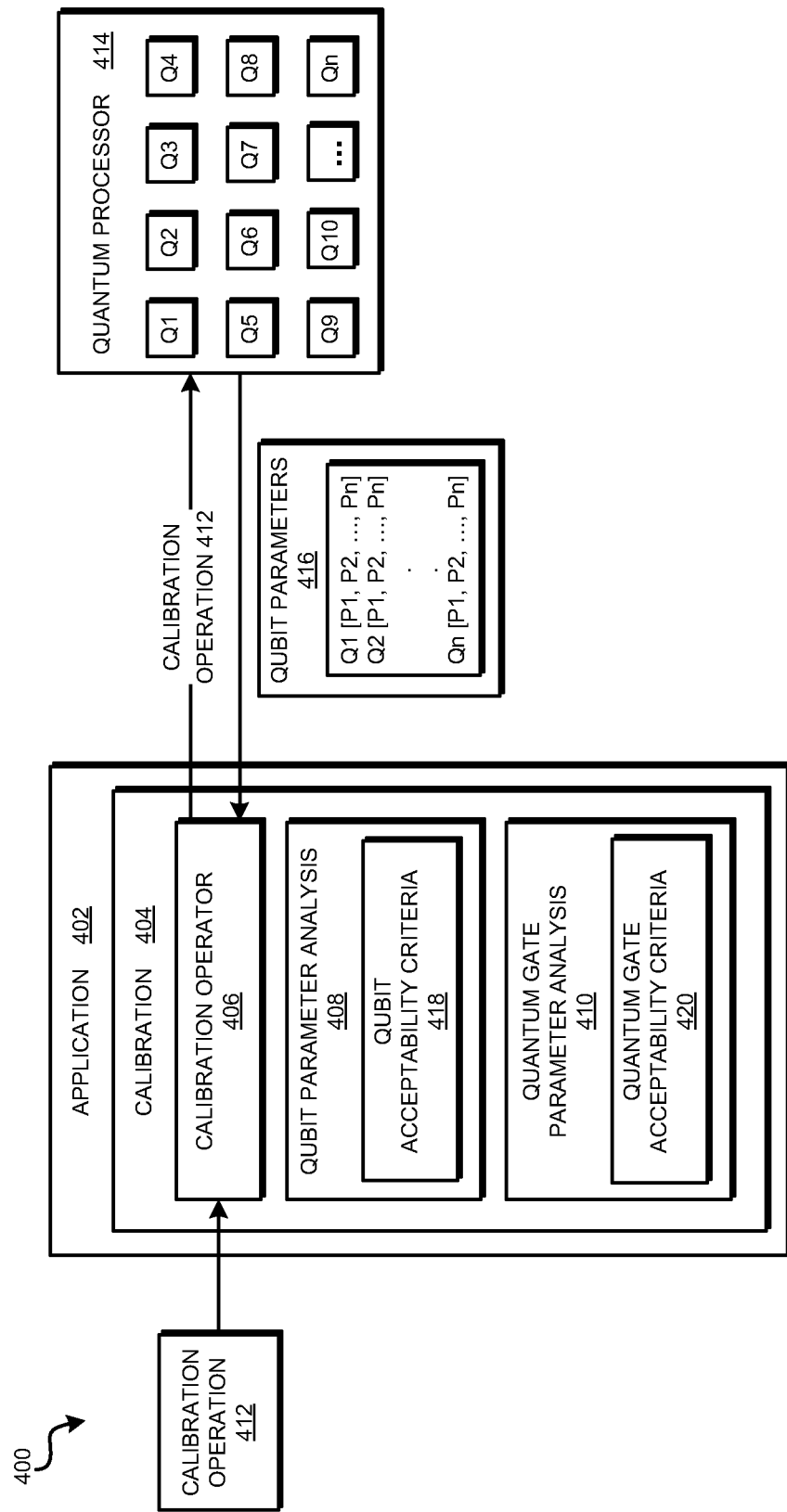
FIG. 4 depicts an example configuration for calibration of a quantum processor in accordance with an illustrative embodiment.

With reference to FIG. 4, this figure depicts an example configuration for calibration of a quantum processor in accordance with an illustrative embodiment. The example embodiment includes an application 402. In a particular embodiment, application 402 is an example of application 105 in FIG. 1.

Application 402 includes calibration component 404. In a particular embodiment, component 404 is an example of component 304 in FIG. 3. Component 404 includes calibration operator component 406, qubit parameter analysis component 408, and quantum gate parameter analysis component 410. Application 402 receives a calibration operation 412.

Calibration operator 406 executes calibration operation 412. In an embodiment, calibration operation 412 performs a set of operations a plurality of qubits Q1, Q2, Q3, . . . On of the quantum processor 414. In an embodiment, calibration operation 412 performs a method of randomized benchmarking. For example, calibration operation 412 can perform a set of pre-determined operations on a plurality of qubits of the quantum processor 414. The set of pre-determined operations generate a set of values for each qubit in response to performing the set of pre-determined operations. In an embodiment, calibration operator 412 compares the set of values for each qubit to an expected answer of at least one of the set of pre-determined operations.

In an embodiment, calibration operation 412 returns a set of qubit parameter values 416 for the plurality of qubits of the quantum processor 414. For example, qubit coherence time, qubit relaxation time, measurement error, and other qubit parameter values can be determined by the calibration operation. Each qubit of the quantum processor 414 can include a subset of the set of parameter values. For example, qubit Q1 can include associated parameter values P1, P2, . . . , Pn, etc. These examples of qubit parameter values are not intended to be limiting. From this disclosure, those of ordinary skill in the art will be able to conceive of many other qubit parameter values suitable for calibrating a set of qubits and the same are contemplated within the scope of the illustrative embodiments.

In an embodiment, calibration operation 412 returns a set of quantum gate parameters. For example, calibration operation 412 can return a parameter corresponding to an error rate for each quantum gate in the quantum processor 414. In an embodiment, calibration operation 412 returns a parameter corresponding to an error rate for each one and two qubit gate (primitive gate) in the quantum processor 414.

Component 408 analyzes the set of qubit parameter values 416. In an embodiment, component 408 analyzes the set of qubit parameter values 416 according to at least one of a set of qubit acceptability criteria 418. For example, component 408 can compare a parameter value of a qubit to a qubit acceptability criterion. For example, component 408 can determine a coherence time of a qubit fails to satisfy a threshold coherence time to perform a set of operations. As another example, component 408 can determine a coherence time of another qubit meets a threshold coherence time to perform the set of operations.

Component 410 analyzes a set of quantum gate parameters. In an embodiment, quantum gate parameters correspond to the set of qubits forming the quantum gate and the layout of the qubits on the quantum processor. In an embodiment, calibration operation 412 returns a set of quantum gate parameters values for a plurality of quantum gates of the quantum processor 414. For example, gate error rates, gate speeds, gate cross talk matrix, and other quantum gate parameter values can be determined by the calibration operation. Each quantum gate of the quantum processor 414 can include a subset of the set of quantum gate parameter values. These examples of quantum gate parameter are not intended to be limiting. From this disclosure, those of ordinary skill in the art will be able to conceive of many other quantum gate parameter values suitable for calibrating a set of quantum gates and the same are contemplated within the scope of the illustrative embodiments.

Component 410 analyzes the set of quantum gate parameter values. In an embodiment, component 410 analyzes the set of quantum gate parameter values according to at least one of a set of quantum gate acceptability criteria 420. For example, component 410 can compare a parameter value of a quantum gate to a quantum gate acceptability criterion. For example, component 410 can determine a gate error rate of a quantum gate fails to satisfy a threshold error rate to perform the quantum gate.

In an embodiment, component 410 generates a composite gate error rate for a composite gate from a set of primitive gate error rates, the composite gate formed from a set of primitive gates corresponding to the primitive gate error rates. In an embodiment, component 410 generates a composite gate error rate for a composite gate formed using three qubits from the formula $$\alpha = \frac{A_{123}B_{12}B_{13}B_{23}}{21}\left(\left(A_{23}B_{23}^{-1} + A_{13}B_{13}^{-1} + A_{12}B_{12}^{-1} + \frac{A_1 + A_2 + A_3}{3} + 9\right)\right),$$

where $A_{xy}$ and $B_{xy}$ are primitive gate error rates for a quantum gate formed from qubits x and y during a first calibration operation and a second calibration operation, respectively.

Figure 5:
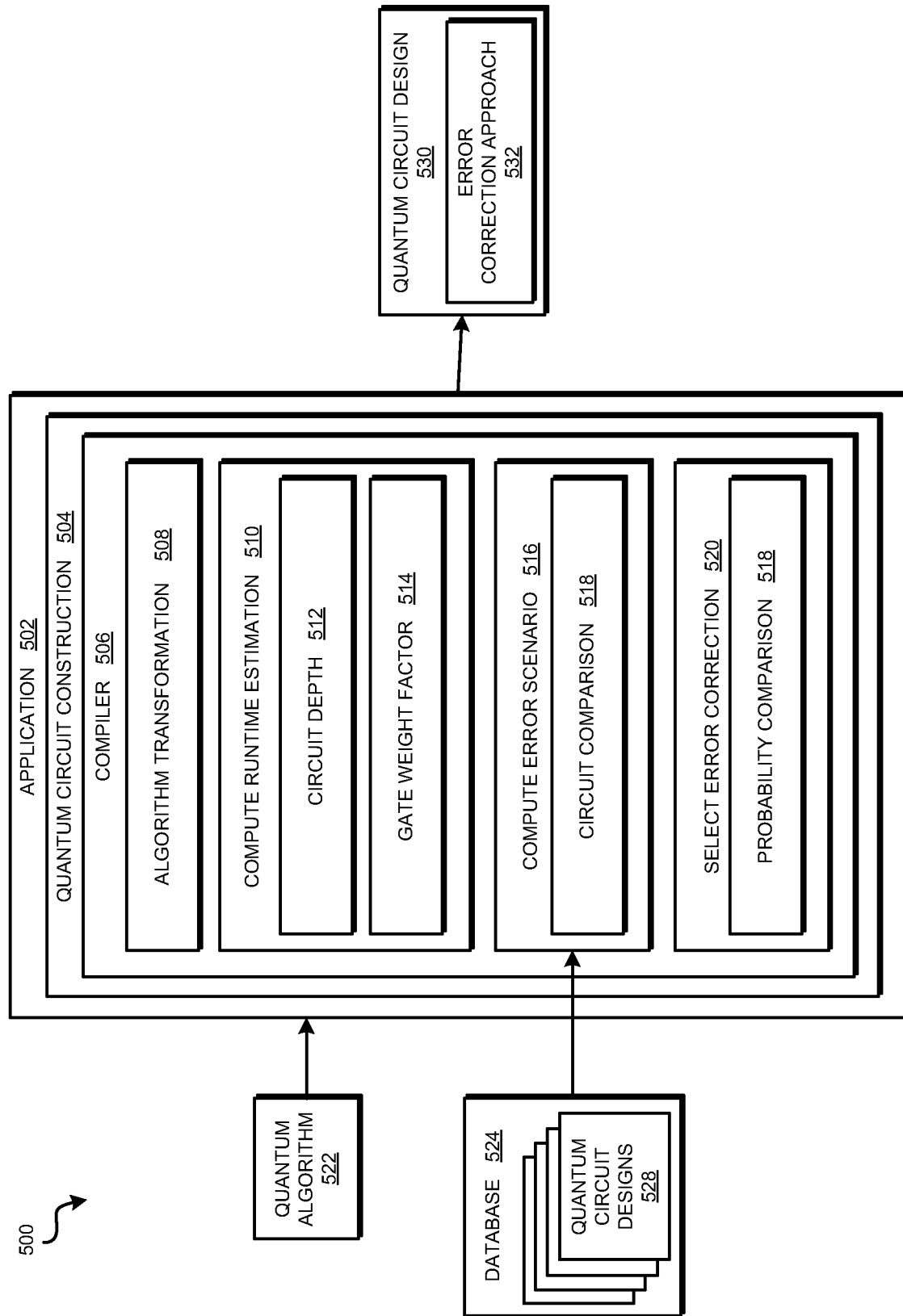
FIG. 5 depicts an example configuration for quantum circuit construction in accordance with an illustrative embodiment.

With reference to FIG. 5, this figure depicts an example configuration for quantum circuit construction in accordance with an illustrative embodiment. The example embodiment includes an application 502. In a particular embodiment, application 502 is an example of application 105 in FIG. 1.

Application 502 includes quantum circuit construction component 504. In a particular embodiment, component 504 is an example of component 306 in FIG. 3. Component 504 includes a quantum circuit compiler component 506. Component 506 is configured to transform an input quantum algorithm 514 into a quantum circuit design 530. Component 516 includes an algorithm transformation component 508.

Component 508 transforms the quantum algorithm code into a first quantum circuit design corresponding to the operations performed by the quantum algorithm. Application 502 receives a set of quantum circuit designs 528 stored in database 524. In particular embodiments, each quantum circuit design 528 includes a previously determined runtime estimation. In particular embodiments, the runtime estimation for each of the stored set of quantum circuit designs is determined from previously executing each of the set of quantum circuit designs on a quantum processor. Database 524 is an example of storage unit 108 in FIG. 1. In an embodiment, runtime estimation component 510 determines a runtime for the quantum algorithm 522. In an embodiment, component 510 compares the quantum algorithm 522 to a set of quantum algorithms corresponding to the set of quantum circuit designs 528. In particular embodiments, component 510 compares the total number of quantum logic gates in the quantum circuit design 530 and the total number of quantum logic gates in at least one of the stored set of quantum circuit designs.

Component 510 includes circuit depth component 512 and gate weight factor 514. In an embodiment, circuit depth component 514 determines a depth of the quantum circuit design 530. In an embodiment, gate weight factor 514 assigns a set of weights to a set of quantum logic gates in the quantum circuit design 530. In particular embodiments, a subset of the set of quantum logic gates with comparatively higher error rates have greater weight factors than quantum logic gates with lower error rates.

Error scenario component 516 determines a worst case error scenario for the quantum circuit design 530. In an embodiment, circuit comparison component 518 analyzes the quantum circuit design 530 to determine the number of quantum logic gates, the type of quantum logic gates, and the state of the quantum processor configured to execute the quantum circuit design 530. In particular embodiments, circuit comparison component 518 determines decoherence times for a set of qubits of the quantum processor. In particular embodiments, each of the set of quantum circuit designs 528 includes a state of the quantum processor determined before executing the corresponding quantum circuit design.

In an embodiment, circuit comparison component 518 compares the quantum circuit design 530 and the state of the quantum processor to the set of quantum logic gates and the corresponding set of states of the quantum processor. In an embodiment, component 518 selects a similar quantum circuit design to the quantum circuit design 530 from the set of quantum circuit designs 528. In particular embodiments, component 518 compares the total number of quantum logic gates, the type of quantum logic gates, and the initial state of the quantum processor between the quantum circuit designs.

In an embodiment, error correction selection component 520 analyzes the quantum circuit design 530, the runtime estimation, and the state of the quantum processor to select an appropriate error correction approach. In an embodiment, component 520 analyzes the number of qubits necessary to execute the quantum circuit design 530. In an embodiment, component 520 analyzes the total number of qubits available for performing computations on the quantum processor. In particular embodiments, component 520 determines a remaining set of qubits available for quantum error correction on the quantum processor. For example, component 520 can determine five qubits are necessary to execute the quantum circuit design 530. Component 520 can determine eight total qubits are available for computations on the quantum processor. Component 520 can determine a remaining three qubits are available for quantum error correction.

In an embodiment, component 520 selects an appropriate quantum error correction technique in response to determining the subset of the set of qubits on the quantum processor available for quantum error correction. In particular embodiments, component 520 selects a quantum error correction technique which produces the highest level of accuracy while also fitting the available qubits for quantum error correction. In particular embodiments, component 520 selects a quantum error correction technique based on the type of quantum logic gates in the quantum circuit design 530.

Probability comparison component 520 determines a number of iterations of performing the quantum circuit design 530 on the quantum processor necessary to reach a threshold level of accuracy. For example, component 520 can determine 120 iterations are necessary to produce a 99% level of accuracy. Component 520 determines a runtime for the selected quantum error correction approach. Component 520 compares the runtime for the selected quantum error correction approach to a runtime for executing additional iterations to reach a threshold level of accuracy. For example, component 520 can determine performing additional iterations produces a similar level of accuracy in less time than the selected quantum error correction approach. Application 502 outputs the quantum circuit design 530 with a corresponding selected quantum error correction approach 532.

Figure 6:
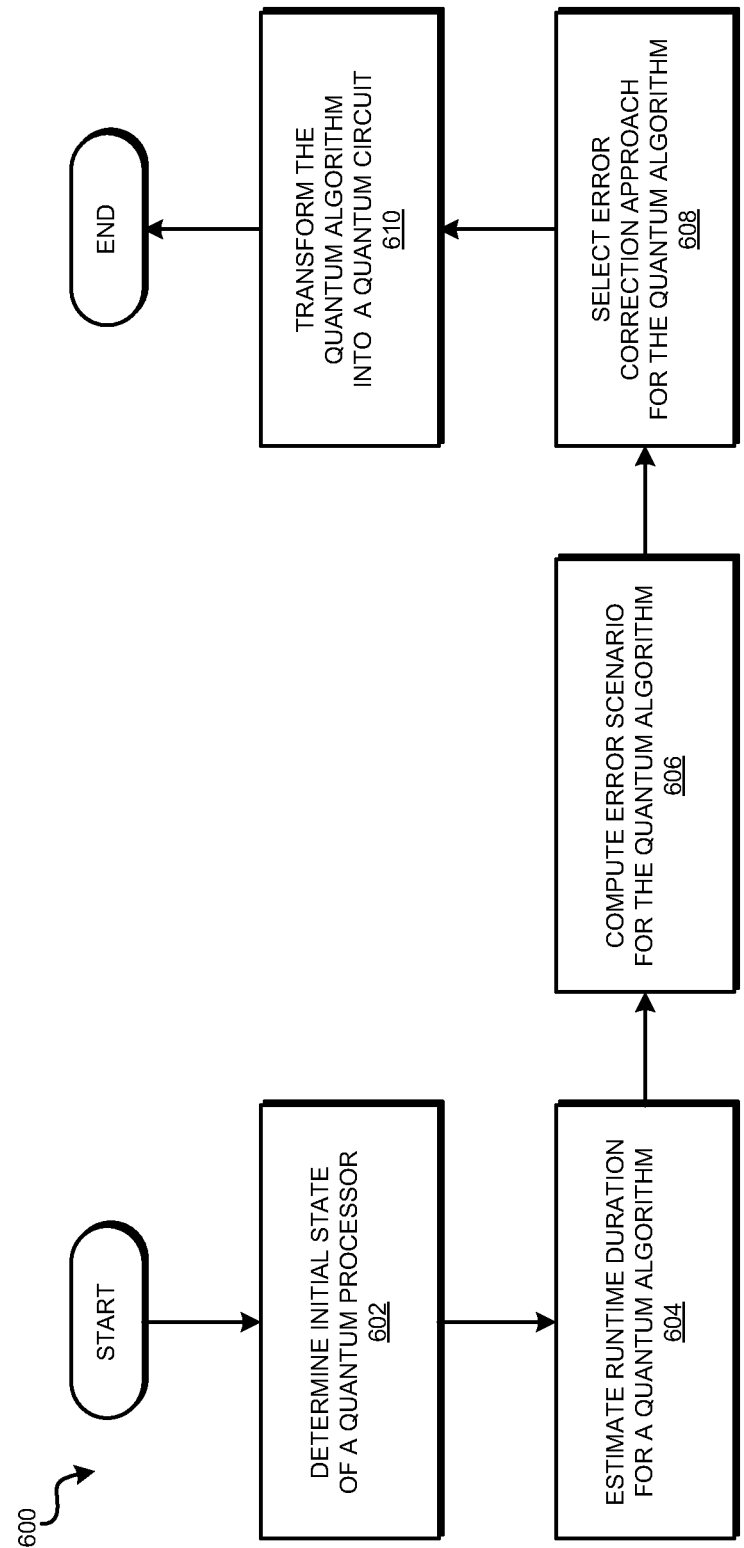
FIG. 6 depicts a flowchart of an example method for adaptive error correction in quantum computing in accordance with an illustrative embodiment.

With reference to FIG. 6, this figure depicts a flowchart of an example method for adaptive error correction in quantum computing in accordance with an illustrative embodiment. Application 105 performs method 600 in an embodiment.

In block 602, application 105 determines an initial state of a quantum processor. In an embodiment, application 105 executes a calibration operation on a set of qubits in a first iteration. In an embodiment, the calibration operation produces a set of parameters, a first subset of the set of parameters corresponding to a first qubit of the set of qubits, and a second subset of the set of parameters corresponding to a second qubit of the set of qubits. In an embodiment, application 105 executes a pre-determined operation on the first qubit. In an embodiment, application 105 compares an output of the pre-determined operation to an expected output.

In block 604, application 105 estimates a runtime duration for a quantum circuit design corresponding to a quantum algorithm. In block 606, application 105 computes an error scenario for the quantum circuit design corresponding to the quantum algorithm. In block 608, application 105 selects an appropriate error correction approach for the quantum circuit design corresponding to the quantum algorithm. In block 610, application 105 transforms the quantum algorithm into the quantum circuit design, the quantum circuit design including a set of quantum logic gates. In an embodiment, a subset of the set of quantum logic gates corresponds to the selected error correction approach. Application 105 ends process 600 thereafter.

Figure 7:
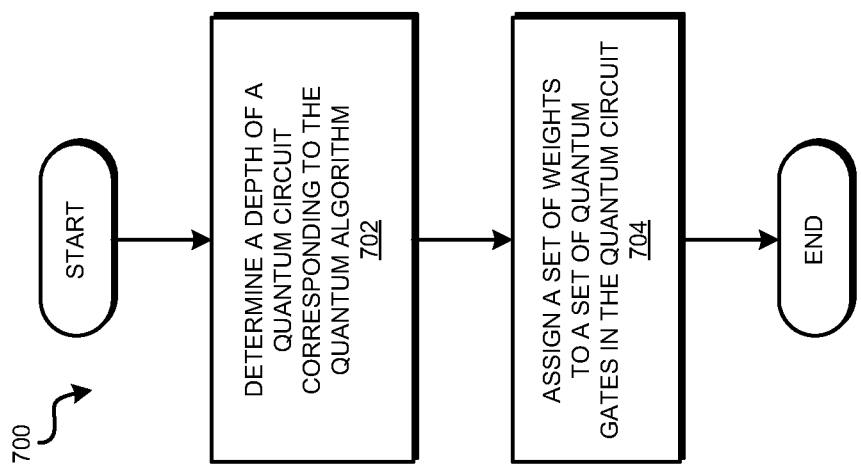
FIG. 7 depicts a flowchart of an example method for estimating runtime of a quantum circuit design corresponding to a quantum algorithm in accordance with an illustrative embodiment.

With reference to FIG. 7, this figure depicts a flowchart of an example method for estimating runtime of a quantum circuit design corresponding to a quantum algorithm in accordance with an illustrative embodiment. Application 105 performs method 700 at block 604 in an embodiment.

In block 702, application 105 determines a depth of the quantum circuit corresponding to the quantum algorithm. In block 704, application 105 assigns a set of weights to a set of quantum logic gates in the quantum circuit design. Application 105 ends process 700 thereafter.

Figure 8:
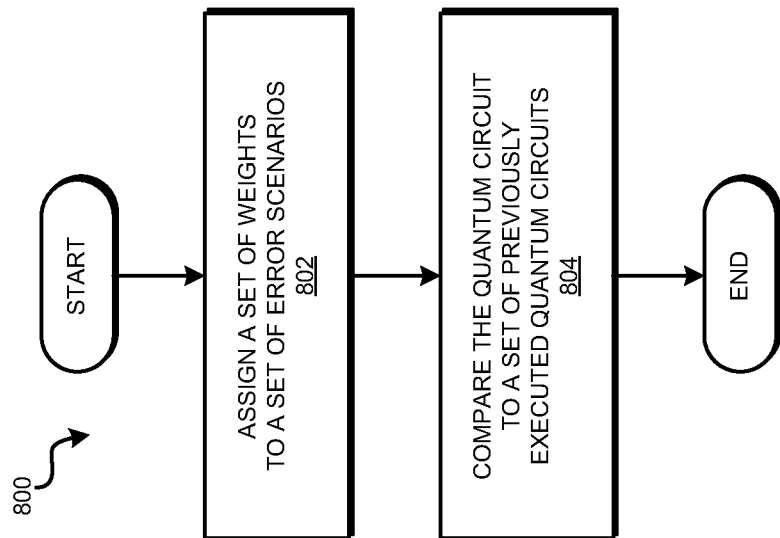
FIG. 8 depicts a flowchart of an example method for computing an error scenario in accordance with an illustrative embodiment.

With reference to FIG. 8, this figure depicts a flowchart of an example method forp computing an error scenario in accordance with an illustrative embodiment. Application 105 performs method 800 at block 606 in an embodiment. In block 802, application 105 assigns a set of weights to a set of error scenarios. In block 804, application 105 compares the quantum circuit design to a set of previously executed quantum circuit designs stored in a database. Application 105 ends process 800 thereafter.

Figure 9:
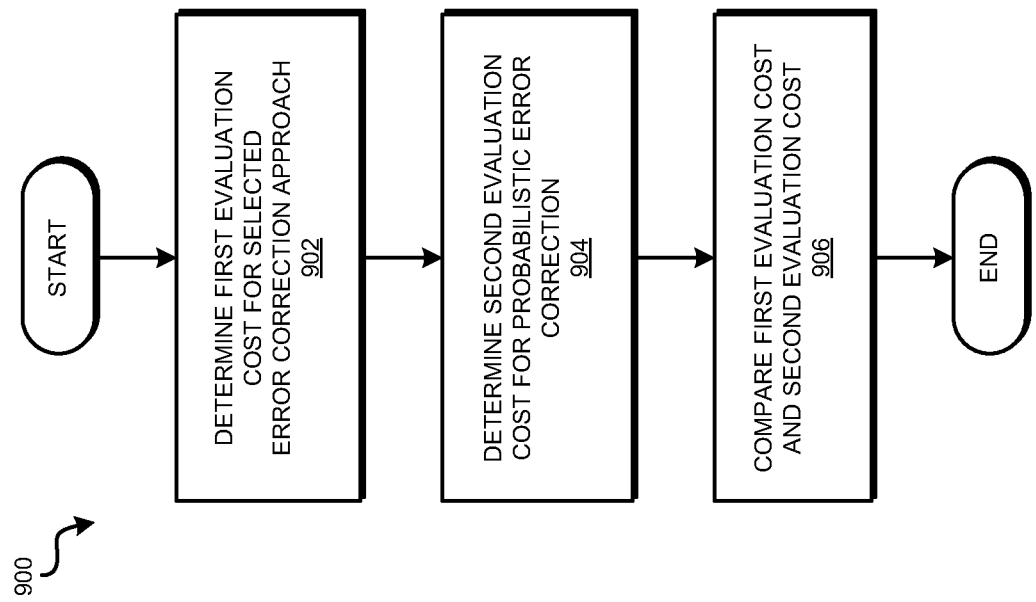
FIG. 9 depicts a flowchart of an example method for selecting an error correction approach in accordance with an illustrative embodiment.

With reference to FIG. 9, this figure depicts a flowchart of an example method for selecting an error correction approach in accordance with an illustrative embodiment. Application 105 performs method 900 at block 608 in an embodiment. In block 902, application 105 determines a first computation (evaluation) cost for a selected error correction approach. In block 904, application 105 determines a second computation (evaluation) cost for a probabilistic error correction approach. In block 906, application 105 compares the first computation cost and the second computation cost. In an embodiment, application 105 chooses the error correction approach with a lower computation cost. Application 105 ends process 900 thereafter.

Various embodiments of the present invention are described herein with reference to the related drawings. Alternative embodiments can be devised without departing from the scope of this invention. Although various connections and positional relationships (e.g., over, below, adjacent, etc.) are set forth between elements in the following description and in the drawings, persons skilled in the art will recognize that many of the positional relationships described herein are orientation-independent when the described functionality is maintained even though the orientation is changed. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
determining, by executing a calibration operation on a quantum processor, a set of parameters of the quantum processor, the calibration operation performing a set of operations on a plurality of qubits of the quantum processor;
determining, by analyzing a quantum circuit design intended for execution by the quantum processor using an initial state of the quantum processor, a number of qubits available for error correction while the quantum circuit design is executed by the quantum processor;
selecting, by the quantum processor, from a library of error correction techniques, a first error correction technique, the first error correction technique being implementable using the number of qubits available for error correction, the first error correction technique having a first runtime;
probabilistically determining, by analyzing the quantum circuit design and the set of parameters, a number of iterations of the quantum circuit design to obtain a threshold level of accuracy when the quantum circuit design is executed by the quantum processor with an error rate determined by averaging together a set of outputs of multiple iterations;
determining, by analyzing the quantum circuit design and the set of parameters, a second runtime required to execute, by the quantum processor, the number of iterations; and
executing, by the quantum processor responsive to determining that the first runtime is shorter than the second runtime, an error-corrected quantum circuit design, the error-corrected quantum circuit design comprising the quantum circuit design and the first error correction technique.

2. The computer-implemented method of claim 1, further comprising:
executing, by the quantum processor responsive to determining that the second runtime is at most equal to the first runtime, the quantum circuit design for the number of iterations.

3. The computer-implemented method of claim 1, wherein the calibration operation comprises generating, by comparing a result of an operation in the set of operations to an expected result, the set of parameters.

4. The computer-implemented method of claim 1, wherein the calibration operation determines a set of qubit parameter values of the plurality of qubits of the quantum processor.

5. The computer-implemented method of claim 1, wherein the calibration operation determines a set of quantum gate parameters of the quantum processor.

6. The computer-implemented method of claim 1, wherein the number of qubits available for error correction comprises a total number of qubits of the quantum processor minus a number of qubits necessary to execute, by the quantum processor, the quantum circuit design.

7. The computer-implemented method of claim 1, wherein the first error correction technique is selected based on a first level of accuracy of the first error correction technique.

8. The computer-implemented method of claim 7, wherein the first level of accuracy is equal to or greater than the threshold level of accuracy.

9. A computer program product for adaptive error correction in quantum computing, the computer program product comprising:
one or more computer readable storage media, and program instructions collectively stored on the one or more computer readable storage media, the program instructions comprising:
program instructions to determine, by executing a calibration operation on a quantum processor, a set of parameters of the quantum processor, the calibration operation performing a set of operations on a plurality of qubits of the quantum processor;
program instructions to determine, by analyzing a quantum circuit design intended for execution by the quantum processor using an initial state of the quantum processor, a number of qubits available for error correction while the quantum circuit design is executed by the quantum processor;
program instructions to select, by the quantum processor, from a library of error correction techniques, a first error correction technique, the first error correction technique being implementable using the number of qubits available for error correction, the first error correction technique having a first runtime;
program instructions to determine, by analyzing the quantum circuit design and the set of parameters, a number of iterations of the quantum circuit design to obtain a threshold level of accuracy when the quantum circuit design is executed by the quantum processor with an error rate determined by averaging together a set of outputs of multiple iterations;
program instructions to probabilistically determine, by analyzing the quantum circuit design and the set of parameters, a second runtime required to execute, by the quantum processor, the number of iterations; and
program instructions to execute, by the quantum processor responsive to determining that the first runtime is shorter than the second runtime, an error-corrected quantum circuit design, the error-corrected quantum circuit design comprising the quantum circuit design and the first error correction technique.

10. The computer program product of claim 9, further comprising:
program instructions to execute, by the quantum processor responsive to determining that the second runtime is at most equal to the first runtime, the quantum circuit design for the number of iterations.

11. The computer program product of claim 9, wherein the calibration operation comprises generating, by comparing a result of an operation in the set of operations to an expected result, the set of parameters.

12. The computer program product of claim 9, wherein the calibration operation determines a set of qubit parameter values of the plurality of qubits of the quantum processor.

13. The computer program product of claim 9, wherein the calibration operation determines a set of quantum gate parameters of the quantum processor.

14. The computer program product of claim 9, wherein the number of qubits available for error correction comprises a total number of qubits of the quantum processor minus a number of qubits necessary to execute, by the quantum processor, the quantum circuit design.

15. The computer program product of claim 9, wherein the first error correction technique is selected based on a first level of accuracy of the first error correction technique.

16. The computer program product of claim 15, wherein the stored program instructions are stored in the at least one of the one or more storage media of a local data processing system, and wherein the stored program instructions are transferred over a network from a remote data processing system.

17. The computer program product of claim 9, wherein the stored program instructions are stored in the at least one of the one or more storage media of a server data processing system, and wherein the stored program instructions are downloaded over a network to a remote data processing system for use in a computer readable storage device associated with the remote data processing system.

18. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
  program instructions to determine, by executing a calibration operation on a quantum processor, a set of parameters of the quantum processor, the calibration operation performing a set of operations on a plurality of qubits of the quantum processor;
  program instructions to determine, by analyzing a quantum circuit design intended for execution by the quantum processor using an initial state of the quantum processor, a number of qubits available for error correction while the quantum circuit design is executed by the quantum processor;
  program instructions to select, by the quantum processor, from a library of error correction techniques, a first error correction technique, the first error correction technique being implementable using the number of qubits available for error correction, the first error correction technique having a first runtime;
  program instructions to determine, by analyzing the quantum circuit design and the set of parameters, a number of iterations of the quantum circuit design to obtain a threshold level of accuracy when the quantum circuit design is executed by the quantum processor with an error rate determined by averaging together a set of outputs of multiple iterations;
  program instructions to probabilistically determine, by analyzing the quantum circuit design and the set of parameters, a second runtime required to execute, by the quantum processor, the number of iterations; and
  program instructions to execute, by the quantum processor responsive to determining that the first runtime is shorter than the second runtime, an error-corrected quantum circuit design, the error-corrected quantum circuit design comprising the quantum circuit design and the first error correction technique.

19. The computer system of claim 18, further comprising:
  program instructions to execute, by the quantum processor responsive to determining that the second runtime is at most equal to the first runtime, the quantum circuit design for the number of iterations.

20. The computer system of claim 18, wherein the calibration operation comprises generating, by comparing a result of an operation in the set of operations to an expected result, the set of parameters.

* * * * *